United States Patent
Heinz et al.

(10) Patent No.: US 7,399,986 B2
(45) Date of Patent: Jul. 15, 2008

(54) APPARATUS AND METHOD FOR READING OUT STORAGE PHOSPHOR PLATE

(75) Inventors: Jürgen Heinz, Marktoberdorf (DE); Markus Atzenbeck, Landsberg/Lech (DE); Thomas Hartmann, Uffing am Staffelsee (DE); Alfons Kastl, Aying (DE); Günther Schindlbeck, Munich (DE); Rudolf Loistl, Unterhaching (DE); Hans Ketterer, Putzbrunn (DE); Otto Butz, Neufahrn (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 0 days.

(21) Appl. No.: 11/552,620

(22) Filed: Oct. 25, 2006

(65) Prior Publication Data

US 2007/0114479 A1    May 24, 2007

(30) Foreign Application Priority Data

Nov. 24, 2005    (EP) .................................. 05111253

(51) Int. Cl.
*B65H 5/00*     (2006.01)
*B65H 7/00*     (2006.01)
(52) U.S. Cl. ...................................... 250/589; 250/584
(58) Field of Classification Search ................. 250/582, 250/589
See application file for complete search history.

(56) References Cited

U.S. PATENT DOCUMENTS

| | | | |
|---|---|---|---|
| 3,286,092 A | 11/1966 | Sames | |
| 3,652,853 A | 3/1972 | Williner et al. | |
| 4,434,501 A * | 2/1984 | Pfeiffer | 378/187 |
| 4,493,417 A | 1/1985 | Ackeret | |
| 4,788,810 A * | 12/1988 | Bauer et al. | 53/284.4 |
| 4,870,285 A | 9/1989 | Ohgoda | |

(Continued)

FOREIGN PATENT DOCUMENTS

EP    1 014 174 A1    6/2000

(Continued)

OTHER PUBLICATIONS

Search Report from European Patent Application No. 05111253.0—2217, filed on Nov. 24, 2005.

*Primary Examiner*—Davd P. Porta
*Assistant Examiner*—Casey Bryant
(74) *Attorney, Agent, or Firm*—Houston Eliseeva LLP

(57) ABSTRACT

An apparatus and a corresponding method for reading out a storage phosphor plate (2) with an insertion device for inserting a cassette (1) in which a movably disposed support (3) is located, on top of which the storage phosphor plate (2) lies, a read-out device (20) for reading out the storage phosphor plate (2) and a conveyance device (11, 12) which takes the storage phosphor plate (2) from the support (3) and conveys it in a first direction (R) to the read-out device (20). In order to achieve the most precise and reliable alignment possible of the storage phosphor plate (2) relative to the read-out device (20) in a simple way, a positioning device (13) is provided for shifting the support (3), on which the storage phosphor plate (2) lies, in a second direction (A) which is different from the first direction (R) so that the support (3) and the storage phosphor plate (2) are aligned relative to the read-out device (20).

22 Claims, 2 Drawing Sheets

U.S. PATENT DOCUMENTS

| | | | |
|---|---|---|---|
| 4,889,989 | A | 12/1989 | Yoshimura et al. |
| 4,931,641 | A | 6/1990 | Ohgoda |
| 5,046,716 | A | 9/1991 | Lippold |
| 5,265,865 | A | 11/1993 | Agano et al. |
| 5,441,251 | A | 8/1995 | Ohta |
| 5,990,487 | A * | 11/1999 | Ngo .......................... 250/589 |
| 6,365,909 | B1 * | 4/2002 | Hayakawa et al. .......... 250/584 |
| 6,693,728 | B1 | 2/2004 | Kinoshita et al. |
| 2004/0169152 | A1 * | 9/2004 | Tsutoh et al. ............... 250/589 |
| 2004/0251596 | A1 | 12/2004 | Csaszar et al. |
| 2005/0104011 | A1 | 5/2005 | Schindlbeck et al. |
| 2005/0260517 | A1 | 11/2005 | Schindlbeck et al. |
| 2006/0091336 | A1 | 5/2006 | Muller et al. |
| 2007/0114448 | A1 | 5/2007 | Pirmann et al. |

FOREIGN PATENT DOCUMENTS

| | | |
|---|---|---|
| EP | 1 494 068 A1 | 1/2005 |
| EP | 1 494 069 A1 | 1/2005 |

* cited by examiner

APPARATUS AND METHOD FOR READING OUT STORAGE PHOSPHOR PLATE

RELATED APPLICATIONS

This application claims priority to European Application No. EP05111253.0, filed on Nov. 24, 2005, which is incorporated herein by reference in its entirety.

BACKGROUND OF THE INVENTION

One way of recording X-ray pictures is to store the image generated by X-ray radiation passing through an object, for example a patient, as a latent picture in a so-called storage phosphor layer. In order to read out the latent picture, the storage phosphor layer is irradiated with stimulation light, and so stimulated into emitting emission light. The emission light, the intensity of which corresponds to the picture stored in the storage phosphor layer, is collected by an optical detector and converted into electric signals. The electric signals are further processed as required, and finally made available for analysis, in particular for medical/diagnostic purposes in that they are displayed on a corresponding display unit, such as e.g. a monitor or a printer.

Patent application US 2004/0251596 A1 discloses a cassette with a movable support within the cassette on which a flexible storage phosphor plate is located. As one starts to remove the storage phosphor plate from the cassette, the cassette is opened by opening a closure flap, and the support within the cassette is moved forward in the direction of the cassette opening until finally, it strikes a guide element disposed in the region of the cassette opening on the cassette floor, by means of which it is pressed downwards, and is in this way released from the storage phosphor plate. The storage phosphor plate is then withdrawn from inside the cassette with a mechanism, not described in greater detail, and introduced into a read-out device. During the conveyance within the cassette, the support is guided along the inner edge of the cassette by slide- or roller-bearings.

SUMMARY OF THE INVENTION

With the apparatus described above, it can arise that the storage phosphor plate is not positioned in relation to the read-out device with the required accuracy, and this can result in a loss of X-ray information when reading out the storage phosphor plate.

It is the object of this invention to provide an apparatus and a method for reading out a storage phosphor plate with which the most precise and reliable alignment of the storage phosphor plate possible relative to the read-out device is achieved in a simple way.

This object is fulfilled using a positioning device for shifting the support on which the storage phosphor plate lies. The support is shifted by the positioning device in a second direction which is different from a first direction in which the storage phosphor plate is conveyed to the read-out device so that the support and the storage phosphor plate located on it are aligned relative to the read-out device.

The invention is based upon the idea of achieving alignment of the storage phosphor layer relative to the read-out device not by shifting the storage phosphor layer itself, but by shifting the support on which the storage phosphor layer is located. In this way, simple, reliable and precise alignment of the storage phosphor plate relative to the read-out device is made possible. At the same time, with the alignment according to the invention, the position of the storage phosphor plate relative to the support remains unchanged by shifting the support, such that after read-out, reliable conveyance of the storage phosphor plate back onto the support is guaranteed.

Preferably, the support is shifted in the second direction by the positioning device while the support and the storage phosphor plate lying on top of it are located at least partially outside of the cassette. In this way, the support is particularly easily accessible for the positioning device.

Moreover, it is preferred if the positioning device comprises one or more alignment pins, and the support comprises one or more guides in which the alignment pins can engage. In particular, the guides are in the form of recesses in the region of an edge of the support so that the alignment pins can engage in these recesses, shifting and alignment of the support then taking place. This embodiment is a particularly cost-effective and reliable variation of the invention.

Preferably, the recesses in the region of the edge of the support have one or more bevels. By means of the bevel of the recesses, more reliable alignment of the storage phosphor plate relative to the read-out device is guaranteed with a particularly simple structure.

In a further preferred variation of the invention, provision is made such that the positioning device can shift the storage phosphor plate lying on the support relative to the support. This is preferably implemented in that the alignment pins protrude over the plane of the support and are thus moved along the guides and recesses in the direction of the storage phosphor plate; the storage phosphor plate is in this way shifted in the direction of movement of the alignment pins. The storage phosphor plate lying on the support is preferably shifted here by the positioning device in a third direction which is opposite to the first direction in which the storage phosphor plate is conveyed to the read-out device. In this way, not only is an alignment of the support and so of the storage phosphor plate relative to the read-out device possible, but also an alignment of the storage phosphor plate relative to the support.

Moreover, it is preferred if the positioning device remains in contact with the support until the storage phosphor plate is positioned back on the support following the read-out in the read-out device. In this way it is guaranteed that the support maintains its position aligned relative to the read-out device so that particularly reliable conveyance of the storage phosphor plate back to the support following the read-out process is guaranteed.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
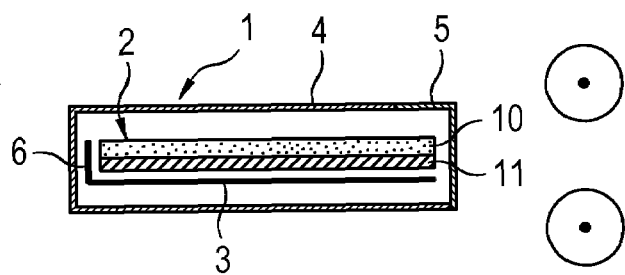
FIGS. 1a) to 1e) are schematic side views (cross-section) of a cassette in different phases during removal of the storage phosphor plate.

FIGS. 1a) to 1 e) show a cassette 1 in different phases during the removal of a storage phosphor plate 2. The cassette 1 comprises a cassette housing 4 with an opening which is sealed from light by means of a pivotable closure flap 5. Within the cassette housing 4 there is a level support 3 on which the storage phosphor plate 2 lies.

The storage phosphor plate 2 usually substantially consists of a storage phosphor layer 10 which is applied to a substrate 11. The storage phosphor layer 10 is made up, for example, of powdery storage phosphor particles which are applied to the substrate 11 by means of a suitable binder. Alternatively, the storage phosphor layer 10 can comprise of a plurality of needle-shaped phosphor structures which are preferably produced by vaporisation on the substrate 11. The corresponding storage phosphor plates are therefore also called Powder Image Plates (PIP) or Needle Image Plates (NIP).

The substrate 11 is preferably a thin, flexible foil made of a material through which X-rays can pass, such as e.g. synthetic. The storage phosphor plate 2 lies with its substrate 11 loose on the support 3, and is substantially held on the support 3 by friction forces and/or form-fit, e.g. by means of one or more peripheral elements 6 and/or fixing elements.

Figure 1B:
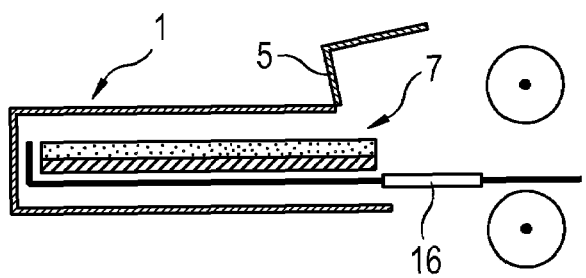

FIG. 1b) shows a first phase of the removal process in which the front-side opening 7 of the cassette 1 is released by raising a pivotable closure flap 5. A removal device 16 engages with the edge of the support 3 and conveys the latter, as shown in FIG. 1c), together with the storage phosphor plate 2 lying on top of it, out of the cassette 1 in direction E to the region of a conveyance device which, in the example shown, has a first and second carrier roller 11 and 12.

Figure 1C:
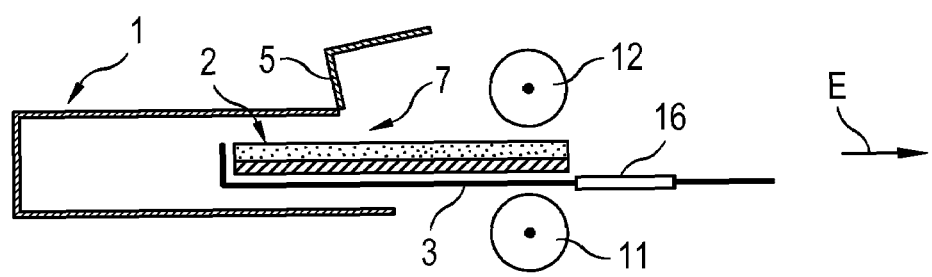
Figure 1D:
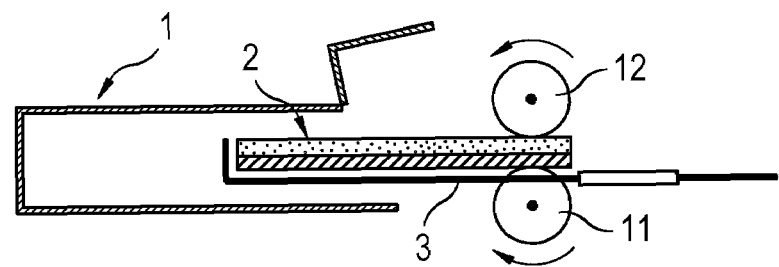
Figure 1E:
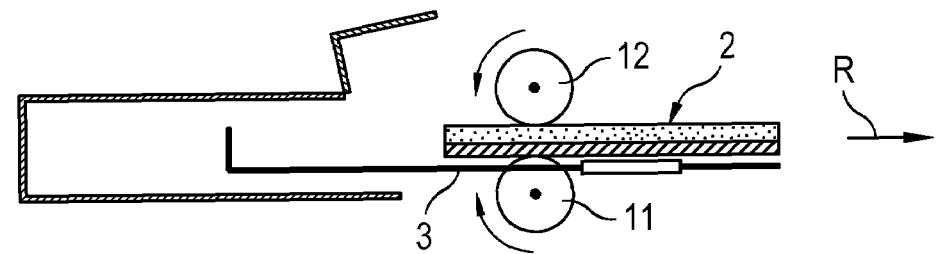

In the phase of the removal process shown in FIG. 1d), the carrier rollers 11 and 12 lie on both sides of the storage phosphor layer 2, and can draw these away from the support 3 in direction R, as shown in FIG. 1e).

Figure 2:
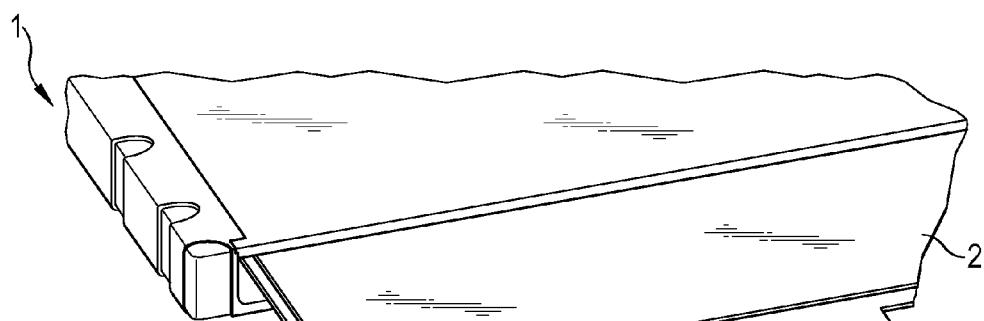
FIG. 2 is a perspective view of a cassette together with the positioning device.

FIG. 2 shows a perspective view of an embodiment of a positioning device constructed according to the principles of the present invention. The support 3 and the storage phosphor plate 2 lying on top of it are partially drawn out of the cassette 1. A positioning device comprises an alignment pin 13 which engages in a recess provided in the region of the edge 17 of the support 3, and can thus shift the support 3 in a second direction A which extends substantially perpendicularly to the first direction R.

In the example shown, the alignment pin 13 is applied to the removal device 16 with which the support 3 is conveyed out of the cassette 1 (see also FIGS. 1b and 1c). In this way, the support 3 can already be shifted in direction A when it is removed from the cassette 1, and so the storage phosphor layer 2 can be aligned relative to a read-out device.

Figure 3:
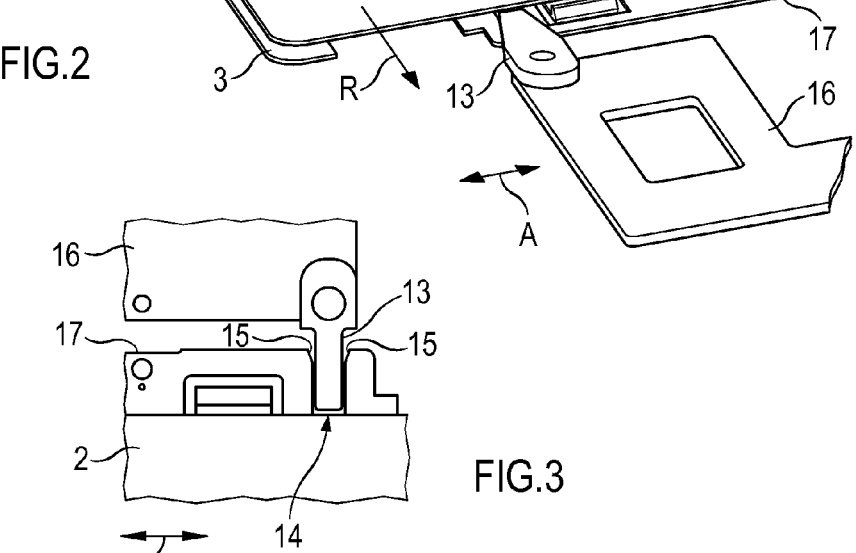
FIG. 3 is a top view (detail) of the positioning device.

FIG. 3 shows a top view of a detail of the embodiment shown in FIG. 2. One can see the support 3 and the storage phosphor plate 2 located on top of the latter. In the region of the edge 17 of the support 3, an oblong recess 14 is provided in which the alignment pin 13 can engage and in which this is guided. In the transition region from the recess 14 to the edge 17 of the support 3, bevels 15 are provided by means of which the support 3 is shifted, in a particularly simple and reliable way, in the second direction A when the alignment pin 13 enters into the recess 14 off-centre.

Figure 4:
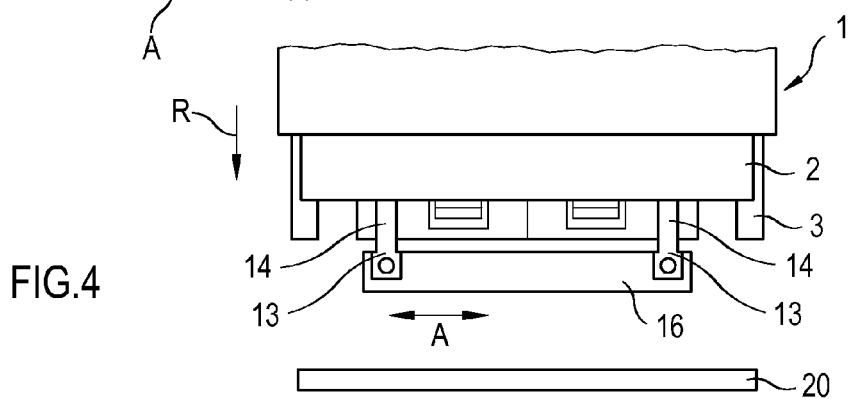
FIG. 4 is a further top view of the apparatus according to the invention.

FIG. 4 shows a further, highly schematised top view of the apparatus according to the invention. In this example, the positioning device comprises two alignment pins 13 which pass into corresponding recesses 14 in the support 3, and this is conveyed here in the second direction A relative to a read-out device 20 in which and through which the storage phosphor plate 2 is conveyed in the first direction R with a conveyance device not shown here (see FIG. 1e).

In this example too, the support 3 is located, together with the storage phosphor plate 2 lying on top of it, partially outside of the cassette 1. In principle it is also possible, however, for the alignment pins 13 of the positioning device to engage in the recesses 14 of the support 3 if the latter is located, together with the storage phosphor plate 2, fully within the cassette 1.

In a preferred embodiment of the invention, provision is made such that the alignment pins 13, following alignment of the support 3, remain in the recesses 14, and so keep the support 3 aligned relative to the read-out unit 20, until the storage phosphor plate 2 is positioned back on the support 3 following the read-out in the read-out unit 20, and lies on this once again. In this way it is guaranteed that the position of the support 3 relative to the read-out device 20 remains unchanged during the whole conveyance and read-out of the storage phosphor plate 2 so that the storage phosphor plate 2 can be taken back to its original position on the support 3 with a high level of reliability.

Figure 5:
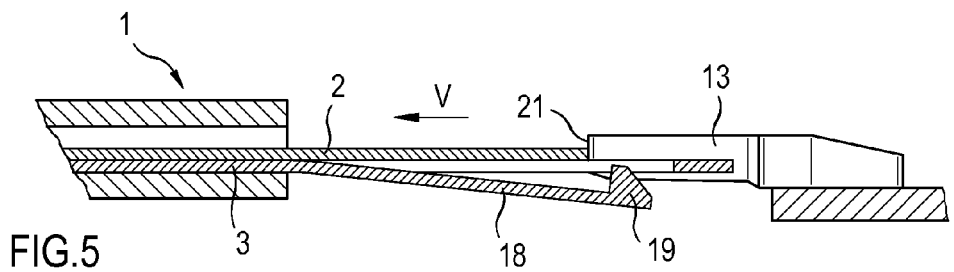
FIG. 5 is a cross-section through the cassette when the support is located, together with the storage phosphor plate located on top of it, partially outside of the cassette.

FIG. 5 shows a cross-section (section) through the cassette 1 when part of the support 3 is located, together with the storage phosphor plate 2 located on top of it, outside of the cassette 1.

In this state, a leaf spring 18 provided in the support 3 is sunk downwards out of the plane of the support 3 so that a projection 19 provided on the leaf spring 18 is also located beneath the support 3, and releases the storage phosphor layer 2 for conveyance from the support 3 in the first direction R.

When the support 3 is located, with the storage phosphor plate 2 lying on top of it, within the cassette 1 (not shown), the leaf spring 18 is pressed by the movement with the floor of the cassette 1 into the plane of the support 3 so that the projection 19 protrudes upwardly out of the plane of the support, and fixes the storage phosphor plate 2 in place on the support 3.

In this example, the alignment pin 13 of the positioning device 8 is designed so that, with a movement in direction V, it can lie with its front surface 21 against the edge of the storage phosphor plate 2, and thus shift this in direction V relative to the support 3. With this embodiment of the invention, by means of the alignment pin 13 therefore, not only can an alignment of the support 3 and so of the storage phosphor plate 2 relative to the read-out device 20 take place (see FIG. 4), but also an alignment of the storage phosphor plate 2 relative to the support 3, by means of which it is guaranteed, in particular, that the storage phosphor plate 2 lies within the projection 19 when the support 3 is located within the cassette 1, so that the projection 19 can reliably fix the storage phosphor plate 2 in place on the support 3.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for reading out a storage phosphor plate contained in a cassette on a movably disposed support, the apparatus comprising:
   a read-out device for reading out the storage phosphor plate;
   a conveyance device which takes the storage phosphor plate from the support and conveys the storage phosphor plate in a first direction to the read-out device;
   a positioning device for shifting the support on which the storage phosphor plate lies in a second direction, which is different from the first direction, to align the support and the storage phosphor plate relative to the read-out device, wherein the positioning device shifts the support in the second direction while the support is located, together with the storage phosphor plate, fully within the cassette.

2. The apparatus according to claim 1, wherein the positioning device comprises one or more alignment pins, and the support comprises one or more guides with which the alignment pins engage.

3. The apparatus according to claim 2, wherein the guides are formed as recesses in the region of an edge of the support, and the alignment pins are able to engage in the recesses, enabling shifting and alignment of the support.

4. The apparatus according to claim 3, wherein the recesses in the region of the edge of the support have a bevel.

5. The apparatus according to claim 1, wherein the positioning device is able to shift the storage phosphor plate lying on the support relative to the support.

6. The apparatus according to claim 5, wherein the positioning device is able to shift the storage phosphor plate lying on the support in a third direction which is opposite to the first direction.

7. The apparatus according to claim 1, wherein the positioning device stays in contact with the support and keeps the support aligned relative to the read-out device until the storage phosphor plate is positioned on the support again after read-out.

8. An apparatus for reading out a storage phosphor plate contained in a cassette on a movably disposed support, the apparatus comprising:
   a read-out device for reading out the storage phosphor plate;
   a conveyance device which takes the storage phosphor plate from the support and conveys the storage phosphor plate in a first direction to the read-out device;
   a positioning device for shifting the support on which the storage phosphor plate lies in a second direction, which is different from the first direction, to align the support and the storage phosphor plate relative to the read-out device;
   wherein the positioning device shifts the support in the second direction, while the support and the storage phosphor plate lying on top of the support are located at least partially outside of the cassette.

9. The apparatus according to claim 8, wherein the positioning device comprises one or more alignment pins, and the support comprises one or more guides with which the alignment pins engage.

10. The apparatus according to claim 9, wherein the guides are formed as recesses in the region of an edge of the support, and the alignment pins are able to engage in the recesses, enabling shifting and alignment of the support.

11. The apparatus according to claim 10, wherein the recesses in the region of the edge of the support have a bevel.

12. The apparatus according to claim 8, wherein the positioning device is able to shift the storage phosphor plate lying on the support relative to the support.

13. The apparatus according to claim 12, wherein the positioning device is able to shift the storage phosphor plate lying on the support in a third direction which is opposite to the first direction.

14. An apparatus for reading out a storage phosphor plate contained in a cassette on a movably disposed support, the apparatus comprising:
   a read-out device for reading out the storage phosphor plate;
   a conveyance device which takes the storage phosphor plate from the support and conveys the storage phosphor plate in a first direction to the read-out device;
   a positioning device for shifting the support on which the storage phosphor plate lies in a second direction, which is different from the first direction, to align the support and the storage phosphor plate relative to the read-out device;
   wherein the positioning device comprises one or more alignment pins, and the support comprises one or more guides with which the alignment pins engage;
   wherein the positioning device is able to shift the storage phosphor plate lying on the support relative to the support;
   wherein the positioning device is able to shift the storage phosphor plate lying on the support in a third direction which is opposite to the first direction;
   wherein the alignment pins lie on an edge of the storage phosphor plate and are able to shift the plate relative to the support.

15. A method for reading out a storage phosphor plate held in a cassette on a movable support, the method comprising:
   conveying the storage phosphor plate from the support in a first direction to a read-out device in which the storage phosphor plate is read out;
   shifting the support, on which the storage phosphor plate lies, in a second direction which is different from the first direction to align the support and the storage phosphor plate relative to the read-out device, while the support is located, together with the storage phosphor plate, fully within the cassette.

16. The method according to claim 15, wherein the step of shifting the support comprises moving one or more alignment pins into one or more guides on the support.

17. The method according to claim 15, further comprising shifting the storage phosphor plate lying on the support in a third direction which is opposite to the first direction.

18. The method according to claim 15, further comprising maintaining contact between the support and a positioning device to keep the support aligned relative to the read-out device until the storage phosphor plate is positioned on the support again after read-out.

19. A method for reading out a storage phosphor plate held in a cassette on a movable support, the method comprising:
   conveying the storage phosphor plate from the support in a first direction to a read-out device in which the storage phosphor plate is read out;
   shifting the support, on which the storage phosphor plate lies, in a second direction which is different from the first direction to align the support and the storage phosphor plate relative to the read-out device;
   wherein the step of shifting the support is performed while the support and the storage phosphor plate, lying on top of the support, are located at least partially outside of the cassette.

20. The method according to claim 19, wherein the step of shifting the support comprises moving one or more alignment pins into one or more guides on the support.

21. The method according to claim 19, further comprising shifting the storage phosphor plate lying on the support in a third direction which is opposite to the first direction.

22. The method according to claim 19, further comprising maintaining contact between the support and a positioning device to keep the support aligned relative to the read-out device until the storage phosphor plate is positioned on the support again after read-out.

* * * * *